United States Patent
Sessody

[15] 3,700,227
[45] Oct. 24, 1972

[54] TRAVERSING WORKHOLDING CLAMP

[72] Inventor: Donald W. Sessody, Milwaukee, Wis.

[73] Assignee: Applied Power Industries, Inc., Milwaukee, Wis.

[22] Filed: Dec. 9, 1970

[21] Appl. No.: 96,537

[52] U.S. Cl. .................. 269/24, 269/31, 269/32, 269/35, 269/157, 269/223
[51] Int. Cl. .......... B23q 3/08, B23q 3/18, B25b 1/18
[58] Field of Search ........................... 269/32–35, 24, 269/31, 157, 223

[56] References Cited

UNITED STATES PATENTS

| 3,281,140 | 10/1966 | Smierciak | 269/24 |
|---|---|---|---|
| 3,336,022 | 8/1967 | Tridgell | 269/32 |
| 3,578,306 | 5/1971 | Smith | 269/24 |
| 1,736,171 | 11/1929 | Powell | 269/32 X |
| 2,530,085 | 11/1950 | Shaff | 269/32 |
| 2,568,905 | 9/1951 | Wiehsner | 269/31 X |
| 3,173,673 | 3/1965 | Northern | 269/32 |
| 3,554,529 | 1/1971 | Thomas | 269/32 |
| 3,599,957 | 8/1971 | Blatt | 269/32 |
| 3,603,579 | 9/1971 | Odom | 269/32 X |
| 3,241,827 | 3/1966 | Nouel | 269/157 X |
| 3,632,102 | 1/1972 | Sessody | 269/157 X |

Primary Examiner—Wayne A. Morse, Jr.
Attorney—James E. Nilles

[57] ABSTRACT

A traversing workholding clamp, including a base adapted to be mounted on a work surface and a body mounted for pivotal movement on the base between operative and inoperative positions with respect to a workpiece. A traversing clamp arm is mounted for reciprocal motion in the body and includes a clamp assembly at its outer end. A hydraulically actuated piston is mounted in the body for movement toward the base to pivot the body with respect to the base to move the clamp assembly into engagement with the workpiece. Hydraulic fluid passages are provided in the body to move the traversing arm rapidly to an operative position with respect to the workpiece prior to movement of the piston toward the base to apply pressure to the workpiece.

5 Claims, 6 Drawing Figures

PATENTED OCT 24 1972 3,700,227

INVENTOR
DONALD W. SESSODY
BY
James E. Nilles
ATTORNEY

INVENTOR
DONALD W. SESSODY
BY
James E. Nilles
ATTORNEY

TRAVERSING WORKHOLDING CLAMP

BACKGROUND OF THE INVENTION

Workholding clamps are used to apply force or pressure to a workpiece to hold the workpiece in a fixed position while a machining operation is being performed on the workpiece. Various motions are required of these clamps in order to simplify the make-ready procedure for operating a particular machine. The motion of the clamp arm must not interfere with the change of workpieces on the machine. In some of these devices, the clamp arm is pivoted to an inoperative position of the way of the workpiece, and in some instances the clamp arm is moved horizontally out of the path of the workpiece.

SUMMARY OF THE INVENTION

The traversing workholding clamp of the present invention uses the traversing motion of a clamp arm to locate a clamp assembly in an operative position with respect to a workpiece. A hydraulically actuated piston is used to apply pressure to the workpiece through the clamp assembly. The hydraulic passages within the body of the clamp are arranged to initially apply pressure to the traversing clamp arm so that the clamp arm moves to the operative position first, and to subsequently apply hydraulic pressure to the hydraulically actuated piston after the traversing clamp arm has reached the operative position. A single source of hydraulic fluid is connected to the clamp to simultaneously apply hydraulic pressure to the hydraulically actuated piston and the traversing clamp arm. However, the piston is biased by a spring having a sufficient spring rate to allow for movement of the clamp arm before the piston. As soon as the traversing clamp arm reaches the outer position, the build up of hydraulic fluid pressure will move the piston to expose the entire surface of the piston to the hydraulic fluid producing an immediate application of a high force to the clamp assembly. The workholding clamp in its basic design is rugged, simple to operate, and provides a high speed sequence of operation of the traversing arm and piston.

These and other objects and advantages will be apparent from the following detailed description when read in connection with the accompanying drawings.

THE DRAWINGS

DESCRIPTION OF THE INVENTION

Figure 1:
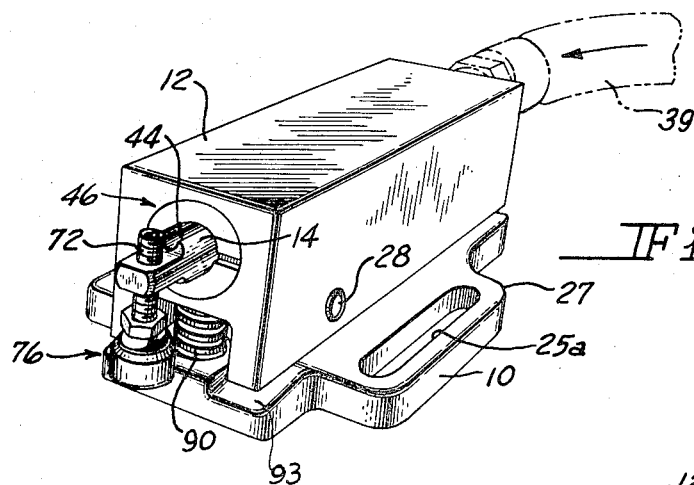
FIG. 1 is a perspective view of the workholding clamp of this invention.
Figure 2:
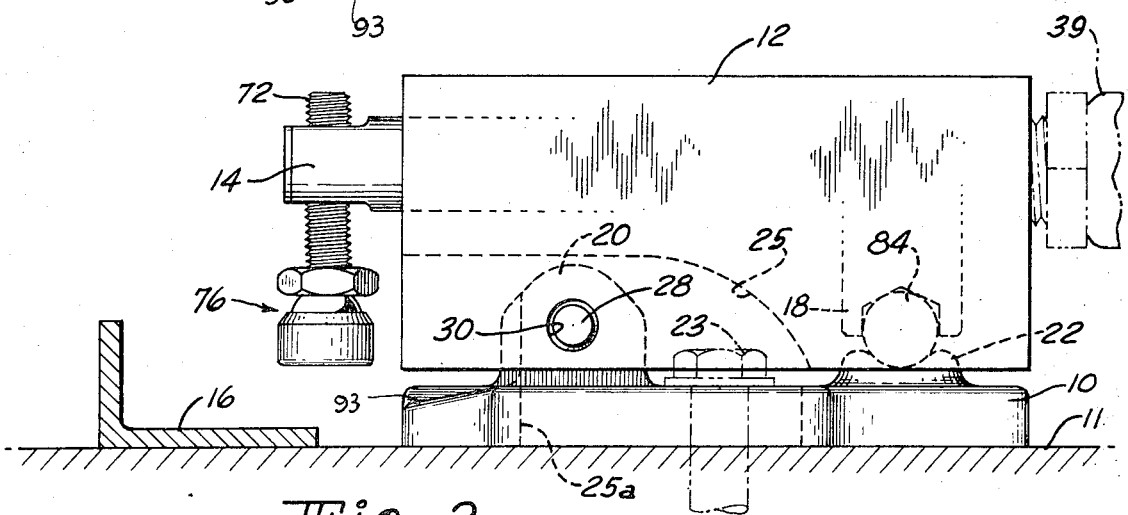
FIG. 2 is a side view in elevation of the clamp shown in the inoperative position.
Figure 3:
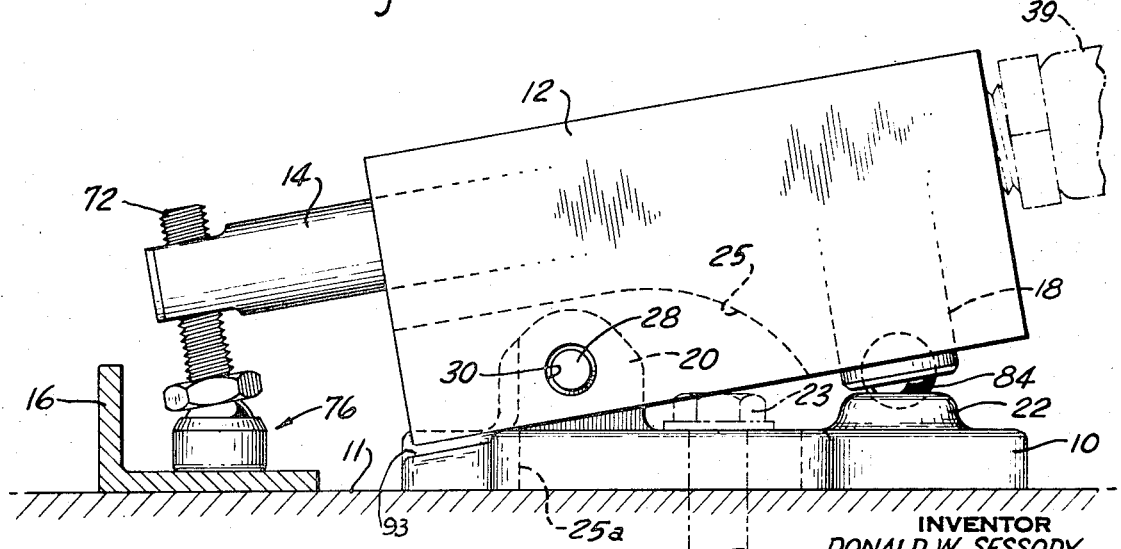
FIG. 3 is a side view similar to FIG. 2 showing the clamp in the operative position.

The workholding clamp of this invention generally includes a base 10 which is adapted to be mounted on a work surface 11 and a body 12 which is pivotally mounted on the base 10. A clamp arm 14 is mounted for movement into and out of the body 12 between an operative position and an inoperative position with respect to a workpiece 16 on the work surface 11. A self-leveling clamp assembly 70 is provided on the outer end of the clamp arm 14. When the clamp arm 14 is moved to the operative position, the body 12 is pivoted by means of a hydraulically actuated piston 18 to move the clamp assembly 70 into engagement with the workpiece 16. The force applied by the piston 18 must be sufficient for the clamp assembly 70 to hold the workpiece 16 in position on the work surface 11 while a machining operation is performed on the workpiece.

Figure 4:
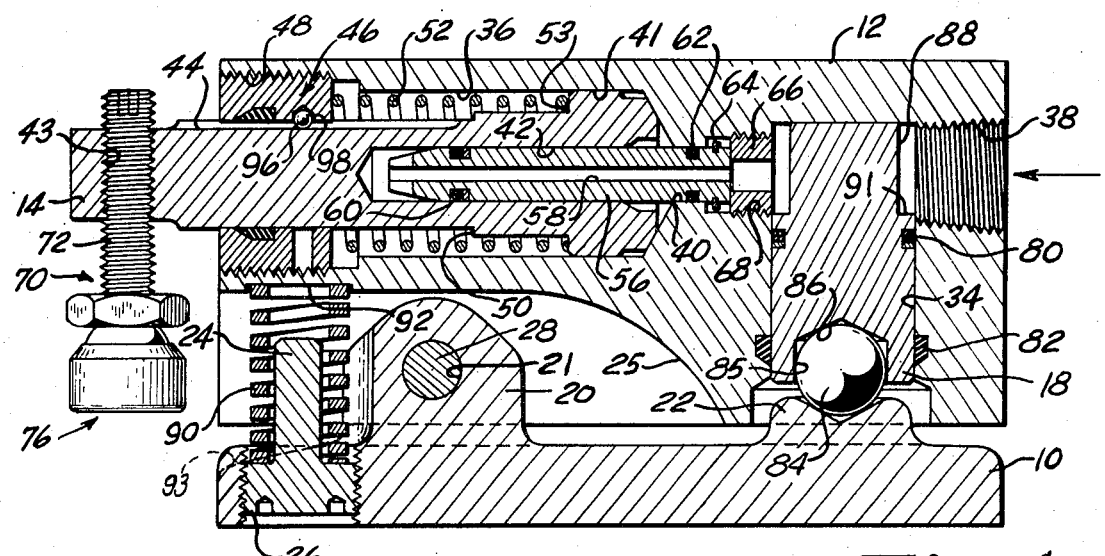
FIG. 4 is a section view taken on line 4—4 of FIG. 5.
Figure 5:
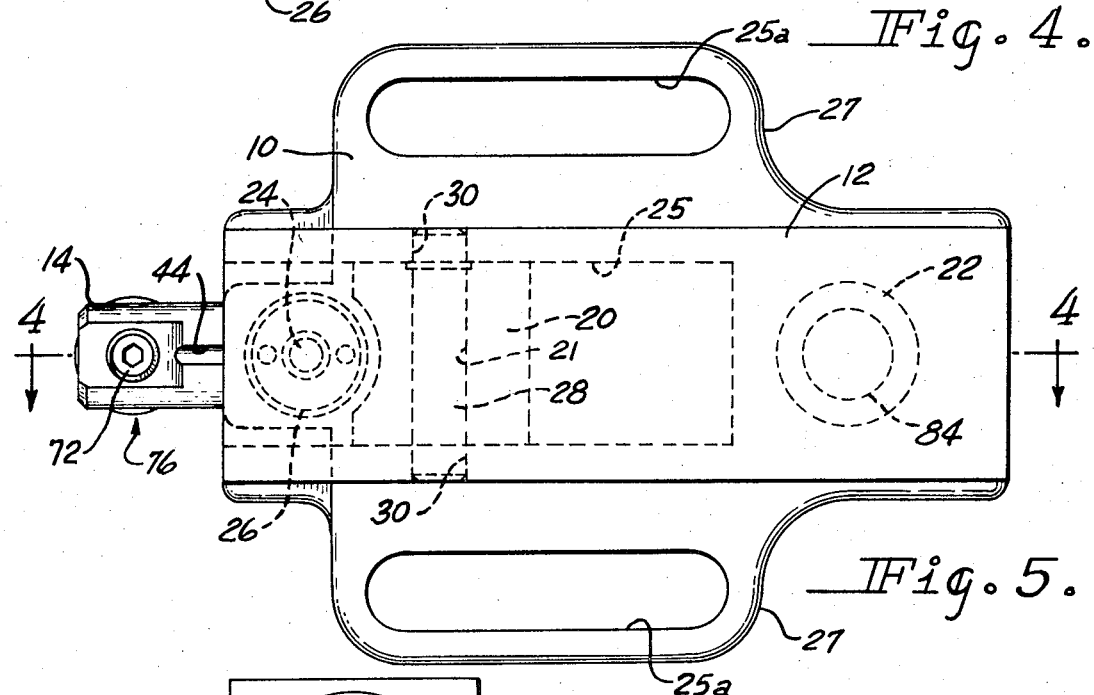
FIG. 5 is a top view of the clamp.
Figure 6:
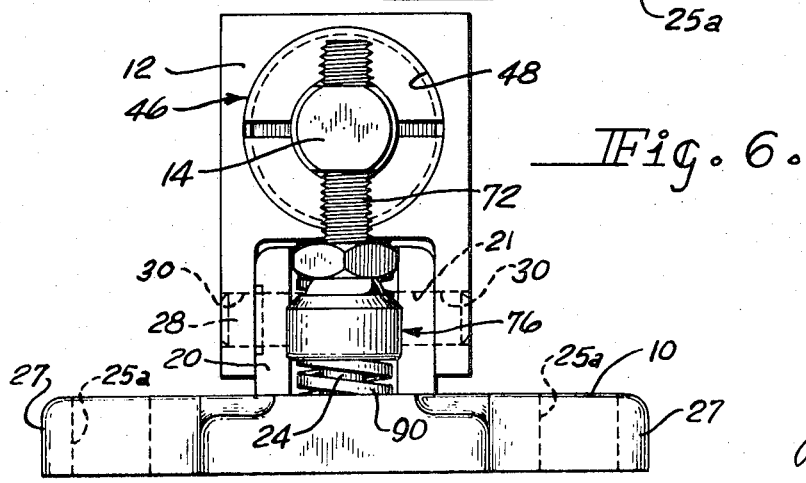
FIG. 6 is a front view of the clamp.

More particularly, and referring to FIG. 4, the base 10 includes a centrally located boss 20 having a pivot pin opening 21. A bearing seat 22 is provided at one end of the base 10 and a threaded bore 26 at the other end for a spring retainer pin 24. The base 10 is secured to the work surface 11 by means of bolts 23 which pass through elongate openings or slots 25a provided in flanges 27 on each side of the base.

The body 12 is pivotally mounted on the base 10 by means of a fulcrum pin 28. A recess 25 is provided in the body 12 which fits over the boss 20. A pair of coaxial openings 30 are provided in the side walls on each side of the recess 25. The fulcrum pin 28 is inserted through apertures 30 provided on each side of the recess 25 and pivot pin openings 21 provided in the boss 20. A first passage or piston cylinder 34 is provided at one end of the body 12 and a second passage or clamp arm cylinder 36 is provided at the other end of the body in a transverse relation to the first passage 34. A bore 40 is provided between passages 34 and 36. Hydraulic fluid is admitted to the first passage 34 through an inlet port 38 connected to a source of high pressure fluid by a hydraulic conduit or line 39.

TRAVERSING CLAMP ARM

The traversing clamp arm 14 is positioned for reciprocal movement in the second passage or cylinder 36 and includes a piston head 41 having a shoulder 53 and a threaded aperture 43. An elongate chamber or bore 42 is provided in the inner end of the clamp arm 14 and a groove 44 is provided on the outer surface of the arm 14 in a generally parallel relation to the axis of the clamp arm 14. An annular shoulder 50 is provided on the end of the clamp arm 14 and includes an annular shoulder 50. The clamp arm 14 is retained in the second passage 36 by means of a bearing stop ring 46 threadedly received in a threaded section 48 provided at the entrance to passage 36. The bearing stop ring 46 is positioned to engage the annular shoulder 50. The clamp arm 14 is biased inwardly to an inoperative or retracted position in the passage 36 by means of a light compression spring 52 which is positioned between the stop ring 46 and the shoulder 53 of the piston head 41. The annular shoulder 50 is spaced from the shoulder 53 a distance sufficient to prevent the spring 52 from being squeezed between the shoulder 53 and the stop ring 46.

Means are provided for traversing or moving the clamp arm 14 to an extended or operative position with respect to the workpiece 16. Such means is in the form of a hollow guide tube 56 having an axial opening 58. The guide tube 56 is positioned in the port 40 and extends into the chamber 42 provided in the clamp arm 14. The longitudinally extending opening 58 in the guide tube 56 provides fluid communication between the first passage 34 and the chamber 42 in the clamp arm 14. O-ring seals 60 and 62 are provided at each end of the guide tube 56 to seal the bore 42 from the second passage 36. The guide tube 56 is free to float in the bore 40 to provide for self-alignment of the guide tube in bore 42 and to thereby avoid concentricity problems. In this regard the guide tube 56 is retained in the port 40 by a snap ring 64 provided on the end of the guide tube 56 and a hollow lock screw 66 provided in a threaded section 68 at the entrance to the port 40. The build up of pressure within the chamber 42 will cause the clamp arm 14 to move outwardly against the bias of the spring 52 to an operative position with respect to the workpiece 16.

The workpiece 16 is held against the work surface 11 by means of a clamp assembly 70 provided in the threaded aperture 43 at the end of the clamp arm 14. The clamp assembly 70 includes a threaded shaft 72 and a self-leveling swivel type clamp pad 76 at the end of the threaded shaft 72. The swivel pad automatically adjusts to the angular relation of shaft 72 to the workpiece 16 to provide an even distribution of pressure on the workpiece. It should be apparent that the clamp assembly 70 can be readily adjusted in the threaded aperture 43 to minimize the motion required to engage the workpiece 16.

TILT ASSEMBLY

Means are provided for pivoting or tilting the body 12 to apply pressure to the workpiece 16 after the clamp arm 14 has been moved to the operative position. Such means is in the form of a piston 18 which is mounted for reciprocal movement in the first passage or cylinder 34. The piston 18 includes a reduced diameter section 88 which terminates at a shoulder 91. The piston 18 is sealed within the first passage 34 by means of an O-ring seal 80. A wiper ring 82 can be provided at the outer end of the cylinder 34 to wipe the surface of the piston 18. Smooth, even loading is provided between the base 10 and the piston 18 by means of a ball 84 which is seated in a recess 86 at the end of piston 18 and bears against the bearing seat 22 provided on the base 10. It should be noted that the ball 84 allows the piston 18 to tilt with respect to the bearing seat 22 while maintaining a substantially constant and uniform loading on the bearing surfaces. The body 12 is biased toward the base 10 by means of a second spring 90 provided on retainer 24 and seated in recess 92; the second spring 90 having a spring rate higher than the first spring 52.

Means are provided for initially moving the clamp arm 14 rapidly to the operative position with respect to the workpiece 16 before the piston 18 is moved toward the base 10. Such means is in the form of the reduced diameter section 88 provided at the upper end of the piston 18 which allows the hydraulic fluid to flow directly into bore 42 in arm 14. The clamp arm 14 will traverse outward immediately until the shoulder 50 engages the hollow stop ring 46. When the clamp arm 14 stops, the continued build-up of pressure in passage 34 will act on the shoulder 91 until the force is sufficient to overcome the bias of spring 90. The piston 18 will move outwardly from the first passage 34 to lock the workpiece 16 in a fixed position on the work surface. A forward stop is provided by means of a shoulder 93 to prevent overtravel of the body 12 and possible damage to the work surface.

To release the workpiece 16 from the workholding clamp, the pressure of the fluid in the conduit 39 is released by an appropriate means. The body 12 will immediately pivot to the initial or inoperative position due to the bias of the spring 90 forcing the piston 18 into the cylinder 34. The clamp arm 14 will not retract until the force exerted by the spring 90 drops below the force exerted by spring 52 on the clamp arm 14. This normally will not occur until the piston 18 seats on the end of the cylinder 34.

Means are provided for maintaining straight line motion of the clamp arm 14 to thereby hold the clamp assembly 70 in a substantially vertical relation to the workpiece 16. Such means is in the form of a ball 96 provided in a small bore 98 on the inner surface of the stop ring 46. The ball 96 cooperates with the groove 44 in the clamp arm 14 to prevent rotary movement of the clamp arm 14.

OPERATION

The base 10 is initially secured to the work surface 11 and is adjusted to the required distance from the workpiece 16. The traversing clamp arm 14 is normally in the inoperative position in the cylinder 36 in the body 12 due to the bias of spring 52. The body 12 is pivoted to the inoperative position by the force of the spring 90 with the piston 18 seated against the end of cylinder 34.

On application of hydraulic fluid pressure through conduit 39 to the first passage 34, the pressure of the hydraulic fluid will increase simultaneously in chamber 34 around the reduced diameter section 88 of the piston and in the cylindrical opening or bore 42 in the clamp arm 14. Since the spring force of spring 52 is less than the spring force of spring 90, the traversing clamp arm 14 will move outward against the bias of the spring 52 until the shoulder 50 seats against the lock ring 46. The clamp assembly 70 will be maintained in a vertical relation to the workpiece by the action of the ball 96 in the groove 44.

When the arm 14 is completely extended in an operative position with respect to the workpiece 16, the hydraulic fluid pressure acting on the shoulder 91 will move the piston 18 out of the body 12 against the bias of spring 90. The entire cross-sectional area of the piston 18 will be exposed to the pressure of the hydraulic fluid on the initial movement of the piston producing an increase in effective force on the piston 18. This increase force will produce a locking of the workpiece in position on the work surface. The clamp assembly 70 is designed to rock on the end of the threaded shaft 72 so that an even distribution of force is applied to the workpiece 16.

RESUME

The workholding clamp disclosed herein provides for the rapid traversing of a clamp arm to an operative position with respect to a workpiece before pressure is applied to the workpiece. The clamp arm is limited to axial motion by a ball and groove provided in the arm. Clamping action is applied by the piston which is exposed to the high pressure fluid immediately after the clamp arm has been fully extended. The amount of force applied can be varied by increasing or decreasing the length of the clamp arm.

What is claimed is:

1. A traversing workholding clamp comprising, a base, a body mounted for pivotal movement on said base, first and second passages in said body, a clamp arm positioned in said first passage for reciprocal movement between operative and inoperative positions in said body, first spring means for biasing said arm to an inoperative position, a cylindrical bore in said clamp arm having a predetermined cross sectional area, a hollow guide tube connecting said second passage to said bore, a piston positioned within said second passage for movement toward said base to pivot said body on said base, said piston having an annular shoulder providing a reduced cross sectional area actuating surface spaced from the end of said piston, second springs means for biasing the end of said piston into abutting engagement with the end of said second passage, the hydraulic force required to act on the cross sectional area of said bore to move said clamp arm being less than the hydraulic force required to act on the shoulder to move the piston, and hydraulic means for applying fluid pressure to said second passage, whereby the pressure of the fluid acting on the cross sectional area of said bore moves the clamp arm to the operative position prior to the movement of said piston toward said base.

2. The clamp according to claim 1 including means for holding said clamp arm in a generally fixed rotary position in said passage.

3. A workholding clamp for holding a workpiece in a fixed position on a work surface, said clamp including, a base adapted to be mounted on the work surface, a body having first and second passages therein, means for pivotally mounting said body on said base, a piston mounted in said second passage for movement toward said base to pivot said body from an inoperative position to an operative position with respect to said workpiece, said piston includes a reduced diameter section and an annular shoulder in said second passage, second spring means for biasing the end of said reduced diameter section into engagement with the end of said second passage, a clamp arm mounted in said first passage for movement from a retracted position to an extended position for operative engagement with said workpiece, first spring means for biasing said clamp arm toward the retracted position, a cylindrical bore in said clamp arm terminating at an operating surface, a hollow guide tube connecting said second passage to said bore, the fluid force required to act on the end of said bore to move the clamp arm to the extended position being less than the fluid force required to act on the shoulder to pivot the valve body, a clamp assembly secured to said clamp arm, means for applying the high pressure fluid to said second passage whereby the pressure of the fluid acting on the end of said bore moves said clamp arm to the extended position prior to the movement of said piston toward said base.

4. The clamp according to claim 3 including means for limiting the movement of said clamp arm to axial movement.

5. The workholding clamp according to claim 3 including an axially extending groove in the outer surface of said clamp arm and a ball fixed in said second passage for engagement with said groove to provide axial movement of said clamp arm.

* * * * *